(12) United States Patent
Morinaga et al.

(10) Patent No.: US 10,882,157 B2
(45) Date of Patent: Jan. 5, 2021

(54) POLISHING PAD AND POLISHING METHOD

(71) Applicant: FUJIMI INCORPORATED, Kiyosu (JP)

(72) Inventors: Hitoshi Morinaga, Aichi (JP); Kazusei Tamai, Aichi (JP); Muneaki Tahara, Aichi (JP); Maiko Asai, Aichi (JP); Yuuichi Ito, Aichi (JP)

(73) Assignee: FUJIMI INCORPORATED, Kiyosu (JP)

( * ) Notice: Subject to any disclaimer, the term of this patent is extended or adjusted under 35 U.S.C. 154(b) by 348 days.

(21) Appl. No.: 15/744,460

(22) PCT Filed: May 18, 2016

(86) PCT No.: PCT/JP2016/064775
§ 371 (c)(1),
(2) Date: Jan. 12, 2018

(87) PCT Pub. No.: WO2017/013935
PCT Pub. Date: Jan. 26, 2017

(65) Prior Publication Data
US 2018/0200861 A1    Jul. 19, 2018

(30) Foreign Application Priority Data

Jul. 17, 2015   (JP) ................................. 2015-143464
Mar. 28, 2016   (JP) ................................. 2016-064312

(51) Int. Cl.
| | |
|---|---|
| *B24B 29/02* | (2006.01) |
| *B24B 37/26* | (2012.01) |
| *B24B 37/24* | (2012.01) |
| *B24B 37/22* | (2012.01) |
| *B32B 5/12* | (2006.01) |
| *B32B 5/24* | (2006.01) |
| *B32B 27/36* | (2006.01) |

(52) U.S. Cl.
CPC .............. *B24B 29/02* (2013.01); *B24B 37/22* (2013.01); *B24B 37/24* (2013.01); *B24B 37/26* (2013.01);
(Continued)

(58) Field of Classification Search
CPC ........... B24B 29/02; B24B 37/22; B32B 5/12; B32B 5/245; B32B 27/36; B32B 2305/22; B32B 2307/72; B32B 2307/732
(Continued)

(56) References Cited

U.S. PATENT DOCUMENTS 5,040,339 A  *  8/1991  Warner .................... B24B 23/02
                                                        15/23
5,355,639 A  *  10/1994  Ferard ....................... B24B 7/30
                                                        451/28
(Continued)

FOREIGN PATENT DOCUMENTS

EP    1 295 682 A1   3/2003
JP    2001-105296 A  4/2001
(Continued)

*Primary Examiner* — George B Nguyen
(74) *Attorney, Agent, or Firm* — Foley & Lardner LLP

(57) ABSTRACT

To provide a polishing pad capable of sufficiently polishing, in polishing of an object to be polished having at least one of a projection portion and a recessed portion on the surface, a portion near the projection portion or the inner surface of the recessed portion of the surface of the object to be polished. The polishing pad has a piloerection portion (1) in which a plurality of fibers (12) having a length of 2 mm or more are raised on the surface of a base (11), in which the mass of the fibers (12) is 250 g/m² or more. The polishing pad is used for polishing an object to be polished (2) containing metal, an alloy, or a metal oxide material and having at least one of a projection portion (21) and a recessed portion (22) on the surface.

16 Claims, 2 Drawing Sheets

(52) U.S. Cl.
CPC ............... *B32B 5/12* (2013.01); *B32B 5/245* (2013.01); *B32B 27/36* (2013.01); *B32B 2305/22* (2013.01); *B32B 2307/72* (2013.01); *B32B 2307/732* (2013.01)

(58) Field of Classification Search
USPC ........................................................ 451/532
See application file for complete search history.

(56) References Cited

U.S. PATENT DOCUMENTS

| | | | |
|---|---|---|---|
| 2004/0224623 | A1 | 11/2004 | Nishiyama et al. |
| 2009/0176055 | A1* | 7/2009 | Yada ...................... B32B 3/266 428/138 |
| 2010/0087128 | A1 | 4/2010 | Nakayama et al. |
| 2015/0099439 | A1 | 4/2015 | Feng et al. |

FOREIGN PATENT DOCUMENTS

| | | | |
|---|---|---|---|
| JP | 2003-165045 | A | 6/2003 |
| JP | 2006-326754 | A | 12/2006 |
| JP | 2007299445 | A * | 11/2007 |
| JP | 2008-055575 | A | 3/2008 |
| JP | 2009-196042 | A | 9/2009 |
| JP | 2010-053502 | A | 3/2010 |
| JP | 2013-043222 | A | 3/2013 |
| TW | 200914204 | A | 4/2009 |

\* cited by examiner

POLISHING PAD AND POLISHING METHOD

TECHNICAL FIELD

The present invention relates to a polishing pad and a polishing method.

BACKGROUND ART

When an object to be polished having a projection portion on the surface is polished using a conventional polishing pad composed of suede, for example, almost the entire surface of the object to be polished has been able to be polished but a portion near the projection portion of the surface of the object to be polished has not been able to be sufficiently polished in some cases because the polishing pad does not contact the portion due to insufficient deformability of the polishing pad.

When a cloth having a piloerection portion in which fibers are raised (see, for example, Patent Literature 1) is used as a polishing pad, the piloerection portion may also contact a portion near the projection portion of the surface of the object to be polished because the piloerection portion has high deformability. However, in polishing using the cloth disclosed in Patent Literature 1 as a polishing pad, a portion near the projection portion of the surface of the object to be polished has not been able to be sufficiently polished depending on the shape or the size of the projection portion in some cases.

The same applies to a case of polishing an object to be polished having a recessed portion on the surface. In the polishing using the conventional polishing pad composed of suede or the polishing using the cloth disclosed in Patent Literature 1 as a polishing pad, the inner surface of the recessed portion has not been able to be sufficiently polished in some cases.

CITATION LIST

Patent Literature

PTL 1: JP 2010-53502 A

SUMMARY OF INVENTION

Technical Problem

Thus, it is an object of the present invention to solve the problems of the conventional techniques described above, and then provide, in polishing of an object to be polished having at least either a projection portion or a recessed portion on the surface, a polishing pad and a polishing method capable of sufficiently polishing a portion near the projection portion or the inner surface of the recessed portion of the surface of the object to be polished.

Solution to Problem

In order to solve the above-described problems, a polishing pad according to one aspect of the present invention is used for polishing an object to be polished containing metal, an alloy, or a metal oxide material and having at least one of a projection portion and a recessed portion on the surface and has a piloerection portion in which a plurality of fibers having a length of 2 mm or more are raised on the surface of a base, in which the mass of the fibers is 250 g/m$^2$ or more.

A polishing method according to another aspect of the present invention includes polishing an object to be polished using the polishing pad according to the above-described one aspect.

Advantageous Effects of Invention

The present invention enables, in polishing of an object to be polished having at least one of a projection portion and a recessed portion on the surface, sufficient polishing of a portion near the projection portion or the inner surface of the recessed portion of the surface of the object to be polished.

DESCRIPTION OF EMBODIMENTS

One embodiment of the present invention is described in detail. The following embodiment merely describes one example of the present invention and the present invention is not limited to this embodiment. The following embodiment can be variously altered or modified and such an altered or modified embodiment may also be included in the present invention.

Figure 1:
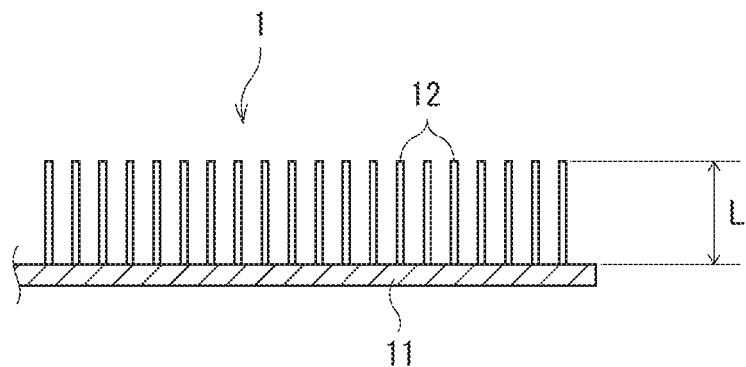
FIG. 1 is a view explaining one embodiment of a polishing pad according to the present invention.

As illustrated in FIG. 1, a polishing pad of this embodiment has a piloerection portion 1 in which a plurality of fibers 12 having a length L of 2 mm or more are raised on the surface of a base 11. The mass of the fibers 12 having a length L of 2 mm or more raised on the surface of the base 11 is 250 g/m$^2$ or more.

Figure 2:
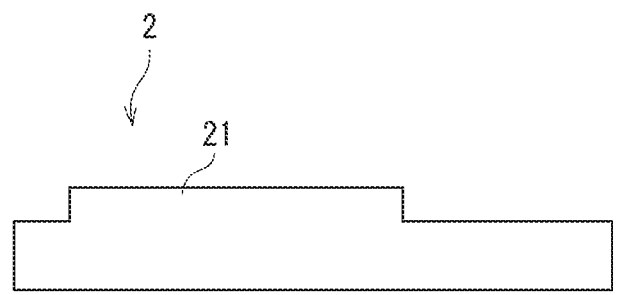
FIG. 2 is a view explaining an object to be polished having a projection portion on the surface.
Figure 4:
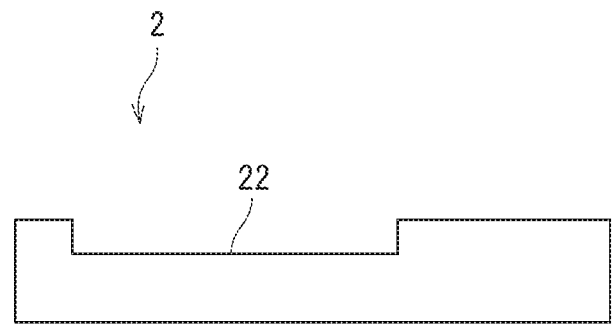
FIG. 4 is a view explaining an object to be polished having a recessed portion on the surface.

When an object to be polished 2 having a projection portion 21 on the surface as illustrated in FIG. 2 or an object to be polished 2 having a recessed portion 22 on the surface as illustrated in FIG. 4 is polished using a conventional polishing pad composed of suede, a nonwoven fabric, polyurethane, or the like, the shape of the polishing pad has not been able to follow the shape of the projection portion 21 or the recessed portion 22 due to insufficient deformability of the polishing pad, so that the polishing pad has not been able to contact a portion near the projection portion 21 (i.e., peripheral portion of a proximal end portion of the projection portion 21) or the inner surface of the recessed portion 22 of the surface of the object to be polished 2, and thus the portion or the inner surface has not been able to be polished in some cases.

However, when the object to be polished 2 having at least one of the projection portion 21 and the recessed portion 22 on the surface is polished using the polishing pad of this embodiment having the above-described configuration, the fibers 12 are deformed, so that the piloerection portion 1 is dented to follow the shape of the projection portion 21 or the recessed portion 22. Therefore, the polishing pad can also contact the portion near the projection portion 21 or the inner surface of the recessed portion 22 of the surface of the object to be polished 2, and thus the portion or the inner surface can be sufficiently polished.

The suede does not have a piloerection portion and is obtained by providing a foamed polyurethane layer having a large number of pores on a substrate. The thickness of the foamed polyurethane layer is usually 1 mm or less and, at most, less than 2 mm.

Hereinafter, the polishing pad, the object to be polished, a polishing method, and the like of this embodiment are described in detail.

(1) Polishing Pad

The length L of the fibers 12 can be selected according to the shape or the size of the projection portion 21 or the recessed portion 22 so that the portion near the projection portion 21 or the inner surface of the recessed portion 22 of the surface of the object to be polished 2 can be sufficiently polished. When the length L of the fibers 12 is 2 mm or more (more preferably 10 mm or more), the deformability of the polishing pad is sufficient. Therefore, the polishing pad can be deformed following the projection portions 21 or the recessed portions 22 of various shapes and sizes so as to sufficiently polish portions near the projection portions 21 or the inner surfaces of the recessed portions 22 of the surface of the object to be polished 2.

The length L of the fibers 12 is selected according to the height of the projection portion 21 or the depth of the recessed portion 22, for example. When the height of the projection portion 21 or the depth of the recessed portion 22 is as large as 1 mm or more, the length L of the fibers is preferably as long as 5.5 mm or more. When the height of the projection portion 21 or the depth of the recessed portion 22 is as small as 0.5 mm or less, the length L of the fibers may be as short as 3 mm or more. With respect to the length of the fibers raised on the surface of the base 11, all the fibers may have the same length but fibers having different lengths may be mixed. The length L of the fibers raised on the surface of the base 11 may be only the fibers 12 having a length L of 2 mm or more but may be both the fibers 12 having a length L of 2 mm or more and fibers having a length L of less than 2 mm.

When the mass of the fibers 12 having a length L of 2 mm or more raised on the surface of the base 11 is 250 g/m$^2$ or more, the amount of the long fibers 12 is sufficient, and therefore the portion near the projection portion 21 or the inner surface of the recessed portion 22 of the surface of the object to be polished 2 can be sufficiently polished. The mass of the fibers 12 having a length L of 2 mm or more raised on the surface of the base 11 is preferably set to 500 g/m$^2$ or more and more preferably set to 800 g/m$^2$ or more.

Furthermore, the number of the fibers 12 having a length L of 2 mm or more raised on the surface of the base 11 may also be set to 1000 fibers/cm$^2$ or more. When the number of the fibers 12 having a length L of 2 mm or more raised on the surface of the base 11 is 1000 fibers/cm$^2$ or more, the amount (density) of the long fibers 12 is sufficient, and therefore the portion near the projection portion 21 or the inner surface of the recessed portion 22 of the surface of the object to be polished 2 can be sufficiently polished.

The number of the fibers 12 having a length L of 2 mm or more raised on the surface of the base 11 is preferably set to 2000 fibers/cm$^2$ or more, more preferably set to 4000 fibers/cm$^2$ or more, and still more preferably set to 5000 fibers/cm$^2$ or more. The fibers 12 may be separately attached to the base 11 one by one or two or more of the fibers may be bundled into a bundled substance or two or more of the fibers may be twisted into a string-like substance, and then the bundled substance or the string-like substance may be attached to the base 11. When two or more of the fibers are twisted, the strength increases, so that the polishing removal rate improves. When not twisted, the number of times that the fibers contact the object to be polished increases, and therefore the surface roughness of the object to be polished after polishing decreases and the glossiness increases in some cases. When attaching the bundled substance or the string-like substance to the base 11, the number of the fibers 12 above does not mean the number of the bundled substances or the string-like substances but means the number of the fibers 12.

The length L of the fibers 12 raised on the surface of the base 11 may be set to 5.5 times or more the height of the projection portion 21 or the depth of the recessed portion 22. With such a configuration, the length of the fibers 12 raised on the surface of the base 11 is sufficiently large relative to the height of the projection portion 21 or the depth of the recessed portion 22, and therefore the deformability of the polishing pad becomes higher. Therefore, the polishing pad can be sufficiently deformed following the projection portion 21 or the recessed portion 22 to be able to more sufficiently polish the portion near the projection portion 21 or the inner surface of the recessed portion 22 of the surface of the object to be polished 2. The length L of the fibers 12 raised on the surface of the base 11 is more preferably set to 7 times or more the height of the projection portion 21 or the depth of the recessed portion 22.

The material of the base 11 is not particularly limited, and cloth, such as a nonwoven fabric, natural materials, such as hemp, resin, such as rubber, and the like are usable.

The type of the fibers 12 is not particularly limited and natural fibers, such as wool, silk, hemp, cotton, horse hair, hog bristles, goat hair, Bella hair, Tampico, palm, and fern, synthetic fibers, such as polyesters (polyethylene terephthalate, polytrimethyleneterephthalate, polybutyleneterephthalate, polyethylenenaphthalate, polybutylenenaphthalate, polylactic acid, and the like), polyamides (nylon, aramid, and the like), polyimide, polyvinyl alcohol, polyolefins (polyethylene, ultrahigh molecular weight polyethylene, polyethylene multifilament, polypropylene, and the like), polyurethane, polyacrylate, polyparaphenylenebenzobisoxazole, polyphenylene sulfide, and fluororesin (polyvinylidene fluoride and the like), metal fibers, carbon fibers, and the like are usable.

Among the natural fibers, wool is preferable because the strength is high. However, when the difficulty (durability and the like) of separation from the base 11 of the fibers 12 is taken into consideration, the synthetic fibers are preferable because the synthetic fibers are more difficult to separate than the natural fibers. Among the synthetic fibers, nylon, polyester, and polypropylene are more preferable. The fibers 12 may contain, as necessary, one or more kinds selected from a micropore forming agent, a dye, a color protection agent, a heat stabilizer, a fluorescent brightening agent, a lusterless agent, a colorant, a dehumidifying agent, inorganic fine particles, abrasives, and resin insofar as the object of the present invention is not impaired.

The thickness or the shape of the fibers 12 is not particularly limited. The thickness of the fibers 12 is preferably 200 μm or less and more preferably 100 μm or less. In addition to the fact that the thinner fibers 12 are less likely to damage the object to be polished 2, the thinner fibers 12 easily follow the shape of the projection portion 21 or the recessed portion 22 of the object to be polished 2. The thickness of the fibers 12 is preferably 10 μm or more, more preferably 15 μm or more, and still more preferably 20 µm or more. When the fibers 12 are excessively thin, the polishing power decreases, so that a sufficient polishing removal rate is not obtained in some cases. The thick fibers 12 are excellent in polishing resistance and are difficult to be worn out, and thus the life as a polishing cloth is extended in some cases. The thickness of the fibers 12 may be uniform over the entire length direction of the fibers 12 but may not be uniform. For example, the thicknesses at the root and the tip of the fibers 12 may be different, e.g., the tip of the fibers 12 is thin, thick, round, or the like.

With respect to the shape of the fibers 12, fibers extending in a linear shape, fibers having a waveform shape, looped fibers (one fiber is bent to form a substantially oval shape or a substantially reversed U-shape, and then attached to the base 11 so that an acutely curved portion is located at the tip), and the like are usable. In the fibers extending in a linear shape and the fibers having a waveform shape, when a corner portion is formed at the tip, the polishing removal rate increases and, when the tip is formed to be round, the fibers 12 are hard to damage the object to be polished. The looped fibers have a round tip, and therefore are hard to damage the object to be polished.

However, from the viewpoint that, since the number of points of contact is large due to point contact with the object to be polished, the number of times of contact with the object to be polished increases, so that the surface roughness of the object to be polished after polishing decreases and the glossiness increases, the fibers extending in a linear shape and the fibers having a waveform shape are more preferable than the looped fibers and fibers which are the fibers extending in a linear shape and the fibers having a waveform shape and have a shape in which the fiber tips are not twisted and are loosened in a tuft shape are more preferable. The looped fibers are brought into line contact with the object to be polished, and therefore the contact surface area is large and the polishing removal rate improves in some cases. The looped fibers have cushioning properties due to the shape, and therefore the fibers are difficult to fall. However, the looped fibers have high friction, and therefore the surface roughness of the object to be polished after polishing deteriorates in some cases as compared with the fibers extending in a linear shape or the fibers having a waveform shape.

The cross-sectional shape of the fibers 12 is not particularly limited and may be a circular shape, an oval shape, a polygonal shape (a triangular shape, a rectangular shape, a pentagonal shape, a hexagonal shape, and the like), a flat shape (linear shape), hollow (The number of hollow portions is not particularly limited and may be one or may be two or more.), or the like. Alternatively, the cross-sectional shape of the fibers 12 may be a C shape, an H shape, an I shape, an L shape, an N shape, an S shape, a T shape, a U shape, a V shape, a W shape, an X shape, a Y shape, a star shape (The number of the sides of the star shape is not limited insofar as the number is three or more.), or the like.

Furthermore, the cross-sectional shape of the fibers 12 may be a shape in which a fin portion radially extends from the perimeter of a core portion (which may be hollow) of a circular shape or a polygonal shape or may be a shape in which a fin portion radially extends from the central point. The number of the fin portions is not particularly limited and may be one or may be two or more. The shape of the fin portion is not particularly limited and includes a linear shape, a curved shape, a bent line shape, and a branched line shape for example.

Furthermore, the cross-sectional shape of the fibers 12 may be a shape in which a plurality (for example, two or three) of unit portions are combined (i.e., shape divided into a plurality of portions). The plurality of unit portions may all have the same cross-sectional shape or may have different cross-sectional shapes. The cross-sectional shape of the unit portions is not particularly limited and the cross-sectional shapes mentioned above as the cross-sectional shapes of the fibers 12 are adoptable. For example, the cross-sectional shape of the fibers 12 may be a shape in which a plurality of unit portions having a cross-sectional shape of a C shape, a V shape, a Y shape, a Z shape, or the like are combined.

With respect to the shape of the tip of the fibers 12, all the fiber tips may have the same shape or fibers having different tip shapes may be mixed.

Furthermore, the surface of the fibers 12 may be a flat shape but may have a projection or a recess.

The fibers 12 may be separately attached to the base 11 one by one or two or more of the fibers may be bundled into a bundled substance or two or more of the fibers may be twisted into a string-like substance, and then the bundled substance or the string-like substance may be attached to the base 11.

As the polishing pad of this embodiment described above, a carpet can be utilized. The type of the carpet is not particularly limited and those manufactured using methods, such as a textile, embroidery, bonding, knitting, compression, and flocking, can be utilized. Examples of carpets manufactured with a textile include machine-made carpets, such as a tufted carpet, Wilson fabric, jacquard fabric, and an Axminster carpet, and hand-made carpets, such as China rug and Pakistan carpet. Examples of the carpets manufactured by embroidery include a hooked rug and the like. Examples of the carpets manufactured by bonding include a bonded pile carpet and the like. Examples of the carpets manufactured by knitting include a knitted carpet and the like. Examples of the carpets manufactured by compression include a needle punched carpet and the like. Examples of the carpets manufactured by flocking include an electrostatically flocked carpet and the like.

Alternatively, those obtained by flocking fibers to a pedestal (base), such as a brush, can be utilized as the polishing pad of this embodiment. A flocking method is not particularly limited and may include forming a hole in the pedestal, inserting one end of the fiber into the hole, and then fixing the fiber by pinning the fiber with a metal or resin pin or bonding the fiber with heat or an adhesive.

The polishing pad of this embodiment may have a multilayer structure in which an elastic layer containing an elastic body is provided on a side opposite to the side in which the fibers 12 are raised of the base 11. When a description is given with reference to FIG. 1, an elastic layer (not illustrated) containing an elastic body may be laminated on the principal surface, of the two principal surfaces of the base 11 having a sheet shape, opposite to the principal surface on the side in which the fibers 12 are raised. Due to the fact that elastic layer is provided, the followability (deformability) of the polishing pad to the shape of the projection portion 21 or the recessed portion 22 of the object to be polished 2 improves.

Examples of the elastic body include a sponge containing a resin foam obtained by foaming resin, such as polyurethane, polyvinyl chloride, chloroprene rubber, ethylene/propylene rubber, butyl rubber, polybutadiene, polyisoprene, an EPDM polymer, ethylene-vinyl acetate, neoprene, melamine, polyethylene, and a styrene/butadiene copolymer.

The number of cells, the compression ratio to the original thickness, the shape, and the density of the resin before foaming of the sponge are not particularly limited and may be selected as appropriate according to the intended use and the like of the polishing pad.

The elastic layer may contain only a single sponge or may contain other materials, such as a cushion material and a reinforcing member, as necessary, in combination.

The thickness of the elastic layer is not particularly limited and is preferably set to 0.1 mm or more and more preferably set to 1 mm or more. When the elastic layer is thin, there is a possibility that sufficient cushioning properties may not be revealed. The thickness of the elastic layer is preferably set to 20 mm or less and more preferably set to 15 mm or less. When the elastic layer is thick, there is a possibility that the attachment to a polishing device of the polishing pad may become difficult. Moreover, heat generated in polishing is accumulated, and thus there is a possibility that the polishing temperature may excessively increase. The thickness of the elastic layer may be changed according to the height or the size of a projection or a recess of the object to be polished and the thickness of the elastic layer can also be set to fall outside the numerical ranges mentioned above.

Furthermore, the surface of the fibers 12 may be subjected to the following treatment after the fibers 12 are attached to the base 11. More specifically, the surface of the fibers 12 may be subjected to steam treatment, shirring, mercerization, coating, softening treatment, fiber splitting treatment, fiber raising treatment, and the like. By performing the treatment, a specific function is given to the fibers 12, the surface of the fibers 12 is unified, the surface of the fibers 12 is smoothened, the fibers 12 are softened, or the fibers 12 are compressed.

(2) Object to be Polished

The shapes of the projection portion 21 and the recessed portion 22 formed on the surface of the object to be polished 2 are not particularly limited. When the polishing pad of this embodiment is used, portions near the projection portions 21 of various shapes and the inner surfaces of the recessed portions 22 of various shapes can be sufficiently polished. Examples of the shapes of the projection portion 21 and the recessed portion 22 include a cone shape, a truncated cone, a cylindrical shape, a pyramid shape, a truncated pyramid shape, a prism shape, a spherical shape, a hemispherical shape, a needle shape, an indefinite shape, and the like.

The sizes of the projection portion 21 and the recessed portion 22 formed on the surface of the object to be polished 2 are not particularly limited. When the polishing pad of this embodiment is used, portions near the projection portions 21 of various shapes and the inner surfaces of the recessed portions 22 of various shapes can be sufficiently polished. For example, even in the case of the projection portion 21 or the recessed portion 22 having such a size that the projected area of the projection portion 21 or the recessed portion 22 in a vertical projection view when the projection portion 21 or the recessed portion 22 is viewed from a point of view at a position perpendicular to the surface of the object to be polished 2 is 0.1 cm$^2$ or more, a portion near the projection portion 21 or the inner surface of the recessed portion 22 can be sufficiently polished.

The projection portion and the recessed portion in the present invention are limited to those in which the projected area thereof is smaller than that of the polishing pad to be used for polishing. More specifically, a large undulation shape or a large wavelike shape curved surface formed on the surface of the object to be polished sometimes has a projected area larger than that of the polishing pad, and therefore is not included in the projection portion and recessed portion in the present invention.

Furthermore, the height of the projection portion 21 or the depth of the recessed portion 22 to be formed on the surface of the object to be polished 2 is not particularly limited. When the polishing pad of this embodiment is used, portions near the projection portions 21 of various heights or the inner surfaces of the recessed portions 22 of various depths can be sufficiently polished. For example, the height of the projection portion 21 and the depth of the recessed portion 22 may be 0.1 mm or more, may be 0.5 mm or more, or may be 1 mm or more. However, the polishing pad of this embodiment is suitable particularly when the height of the projection portion 21 or the depth of the recessed portion 22 is 0.5 mm or more.

Thus, when the polishing pad of this embodiment is used, even in the case of the object to be polished 2 having at least one of the projection portion 21 and the recessed portion 22 of the shape, size, and height described above on the surface, a portion near the projection portion 21 or the inner surface of the recessed portion 22 of the surface of the object to be polished 2 can be sufficiently polished. However, the polishing pad of this embodiment can also be preferably used for polishing an object to be polished having no projection portions and recessed portions on the surface (object to be polished, the entire surface of which is flat).

Materials of the object to be polished are not particularly limited and single silicon, silicon compounds, metals, alloys, metal oxides, single crystal compounds (for example, sapphire and gallium nitride), glass, and the like are mentioned.

Examples of the single silicon include single crystal silicon, polycrystalline silicon (polysilicon), amorphous silicon, and the like, for example. Examples of the silicon compounds include silicon nitride, silicon dioxide (for example, silicon dioxide interlayer insulating film formed using tetraethoxysilane (TEOS)), silicon carbide, and the like, for example.

Examples of the metals include tungsten, copper, aluminum, hafnium, cobalt, nickel, titanium, tantalum, gold, silver, platinum, palladium, rhodium, ruthenium, iridium, osmium, iron, chromium, magnesium, and the like, for example. These metals may be contained in the form of an alloy (for example, stainless steel) or a metallic compound.

A name is given to alloy materials based on the metal species serving as the main component. Examples of the main components of metals or alloy materials include aluminum, titanium, iron, nickel, and copper, for example. Examples of the alloy materials include an aluminum alloy, a titanium alloy, stainless steel (containing iron as the main component), a nickel alloy, and a copper alloy, for example.

The aluminum alloy contains aluminum as the main component and further contains at least one kind of silicon, iron, copper, manganese, magnesium, zinc, and chromium, for example, as a metal species different from the metal species as the main component. The content of the metal species other than the aluminum in the aluminum alloy is, for example, 0.1% by mass or more and more preferably 0.1% by mass or more and 10% by mass or less. Examples of the aluminum alloy include those of Alloy Nos. 2000s, 3000s, 4000s, 5000s, 6000s, 7000s, and 8000s described in H4000:2006, H4040:2006, and H4100:2006 of Japanese Industrial Standards (JIS).

The titanium alloy contains titanium as the main component and contains aluminum, iron, vanadium, and the like, for example, as elements having Vickers hardness greatly different from that of the metal species serving as the main component. The titanium alloy contains the elements having Vickers hardness greatly different from that of the metal species serving as the main component preferably in a proportion of 3.5 to 30% by mass based on titanium. As such a titanium alloy, the types 11 to 23, the type 50, the type 60, the type 61, the type 80, and the like are known in the types according to JIS H4600:2012, for example.

The stainless steel contains iron as the main component and contains chromium, nickel, molybdenum, manganese, and the like, for example, as elements having Vickers hardness greatly different from that of the metal species serving as the main component. The stainless steel contains the elements having Vickers hardness greatly different from that of the metal species serving as the main component preferably in a proportion of 10 to 50% by mass based on iron. As such stainless steel, SUS201, 303, 303Se, 304, 304L, 304NI, 305, 305JI, 309S, 310S, 316, 316L, 321, 347, 384, XM7, 303F, 303C, 430, 430F, 434, 410, 416, 420J1, 420J2, 420F, 420C, 631J1, and the like are known in the codes of the types according to JIS G4303:2005, for example.

The nickel alloy contains nickel as the main component and contains iron, chromium, molybdenum, cobalt, and the like, for example, as elements having Vickers hardness greatly different from that of the metal species serving as the main component. The nickel alloy contains the elements having Vickers hardness greatly different from that of the metal species serving as the main component preferably in a proportion of 20 to 75% by mass based on nickel. As such a nickel alloy, NCF600, 601, 625, 750, 800, 800H, and 825, NW0276, 4400, 6002, and 6022, and the like are known, for example, in Alloy Nos. according to JIS H4551:2000.

The copper alloy contains copper as the main component and contains iron, lead, zinc, tin, and the like, for example, as elements having Vickers hardness greatly different from that of the metal species serving as the main component. The copper alloy contains the elements having Vickers hardness greatly different from that of the metal species serving as the main component preferably in a proportion of 3 to 50% by mass based on copper. As the copper alloy, C2100, 2200, 2300, 2400, 2600, 2680, 2720, 2801, 3560, 3561, 3710, 3713, 4250, 4430, 4621, 4640, 6140, 6161, 6280, 6301, 7060, 7150, 1401, 2051, 6711, and 6712 and the like are known, for example, in Alloy Nos. according to JIS H3100: 2006.

The magnesium alloy contains magnesium as the main component and further contains at least one kind of aluminum, zinc, manganese, zirconium, and a rare earth element, for example, as metal species different from the metal species serving as the main component. The content of the metal species other than magnesium in the magnesium alloy is 0.3% by mass or more and 10% by mass or less, for example. Examples of the magnesium alloy include Alloy Nos. AZ10, 31, 61, 63, 80, 81, 91, 92, and the like described in H4201:2011, H4203:2011, and H4204:2011 of Japanese Industrial Standards (JIS).

The metal oxides are oxides of metals or semimetals or composite oxides thereof and include, for example, oxides of one or more metals or semimetals selected from the elements of Groups III, IV, and XIII of the periodic table, or composite oxides thereof. Specifically, a silicon oxide (silica), an aluminum oxide (alumina), a titanium oxide (titania), a zirconium dioxide (zirconia), a gallium oxide, an yttrium oxide (yttria) and a germanium dioxide and, in addition thereto, composite oxides thereof are mentioned. Among the metal oxides, a silicon oxide, an aluminum oxide (corundum and the like), a zirconium dioxide, and an yttrium oxide are particularly preferable.

The metal oxide contained in the object to be polished may be a mixture of a plurality of oxides of metals or semimetals, may be a mixture of a plurality of composite oxides, or may be a mixture of oxides of metals or semimetal and composite oxides. The metal oxide contained in the object to be polished may be a composite material of oxides of metals or semimetals or a composite oxide and other types of materials (for example, metal, carbon, ceramics).

Furthermore, the metal oxide contained in the object to be polished may have a form of a single crystal, a polycrystal, or a sintered compact (ceramics). When the metal oxide has such a form, the entire object to be polished can be formed of the metal oxide. Or, the metal oxide contained in the object to be polished may have a form of an anodic oxidization coating formed by anodizing pure metal or an alloy. More specifically, the metal oxide contained in the object to be polished may be an oxide which is formed on the surface of metal and obtained by oxidation of the metal itself, such as an anodic oxidization coating of pure metal or an alloy.

When the metal oxide has such a form, the object to be polished can be formed so as to have a portion formed of the metal oxide and another portion formed of another material. When the metal oxide is an anodic oxidization coating, the object to be polished has a portion including the surface thereof containing the metal oxides and another portion containing pure metal or an alloy.

Examples of the anodic oxidization coating include a coating containing an aluminum oxide, a titanium oxide, a magnesium oxide, or a zirconium dioxide.

The object to be polished may be formed by forming a coating by coating treatment, such as thermal spraying (for example, plasma spraying or flame spraying), plating, chemical vapor deposition (CVD), or physical vapor deposition (PVD), on the surface of a substrate containing a material (for example, metal, carbon, and ceramics) of a type different from the metal oxide.

Examples of the coating formed by the thermal spraying include a metal oxide coating containing an aluminum oxide, a zirconium dioxide, or an yttrium oxide.

Examples of the coating formed by plating include a metal coating containing zinc, nickel, chromium, tin, copper, or an alloy thereof.

Examples of the coating formed by chemical vapor deposition include a ceramic coating containing a silicon oxide, an aluminum oxide, or a silicon nitride.

Examples of the coating formed by physical vapor deposition include a metal coating containing copper, chromium, titanium, a copper alloy, a nickel alloy, or an iron alloy.

(3) Method for Polishing Object to be Polished

The polishing of the object to be polished using the polishing pad of this embodiment can be performed by a polishing device and under polishing conditions for use in usual polishing.

Figure 3:
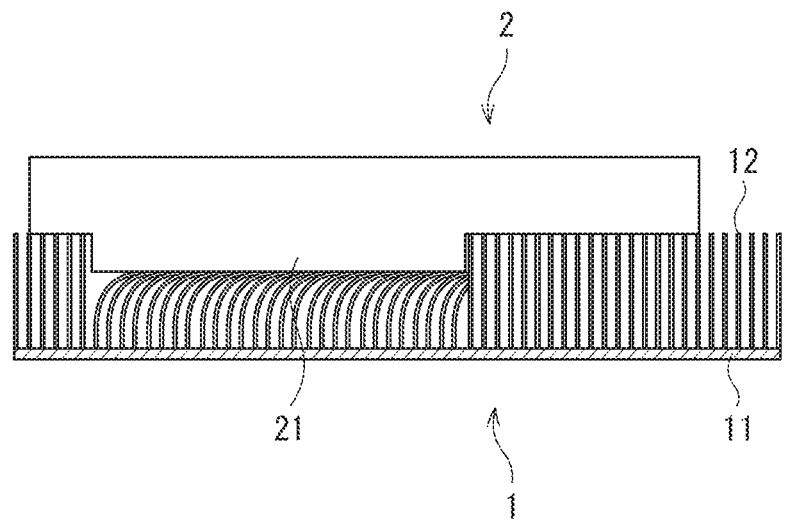
FIG. 3 is a view explaining one embodiment of a polishing method according to the present invention and is a view explaining a method for polishing the object to be polished having a projection portion on the surface.

For example, when the surface on which the projection portion 21 is formed of the object to be polished 2 is pressed against the piloerection portion 1 of the polishing pad as illustrated in FIG. 3, the fibers 12 are deformed so that the piloerection portion 1 is partially dented to follow the shape of the projection portion 21. Therefore, the polishing pad (fibers 12) also contacts a portion near the projection portion 21 of the surface of the object to be polished 2. Therefore, when the object to be polished 2 and the polishing pad are relatively moved to each other to be rubbed in this state, the entire surface of the object to be polished 2 including the portion near the projection portion 21 is polished.

Figure 5:
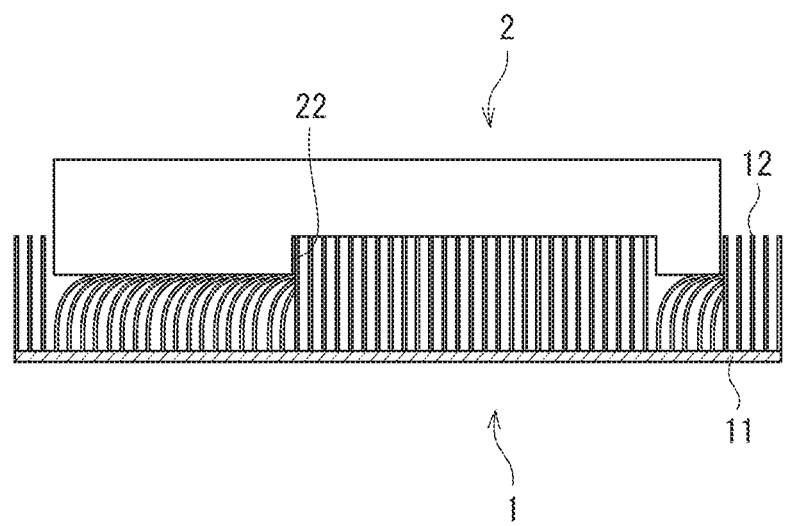
FIG. 5 is a view explaining one embodiment of a polishing method according to the present invention and is a view explaining a method for polishing the object to be polished having a recessed portion on the surface.

When the surface on which the recessed portion 22 is formed of the object to be polished 2 is pressed against the piloerection portion 1 of the polishing pad as illustrated in FIG. 5, the fibers 12 are deformed so that the piloerection portion 1 is partially dented to follow the shape of the recessed portion 22. Therefore, the polishing pad (fibers 12) also contacts the inner surface of the recessed portion 22 of the surface of the object to be polished 2. Therefore, when the object to be polished 2 and the polishing pad are relatively moved to each other to be rubbed in this state, the entire surface of the object to be polished 2 including the inner surface of the recessed portion 22 is polished.

When polishing the object to be polished 2 using the polishing pad of this embodiment, the object to be polished 2 may be polished by placing a polishing composition containing abrasives, additives, liquid media, and the like between the object to be polished 2 and the polishing pad.

The type of the abrasives is not particularly limited and an aluminum oxide, a silicon oxide, a cerium oxide, a zirconium dioxide, zircon, a titanium oxide, a manganese oxide, a silicon carbide, a boron carbide, a titanium carbide, a titanium nitride, a silicon nitride, a boride titanium, a tungsten boride, and the like are mentioned.

Among the above, an aluminum oxide, a zirconium dioxide, zircon (zircon sand), a silicon carbide, and a silicon oxide are preferable, and an aluminum oxide and a silicon oxide are particularly preferable from the ease of availability and cost.

The average secondary particle diameter of the abrasives is preferably 10 μm or less, more preferably 5 μm or less, still more preferably 3 μm or less, and particularly preferably 1 μm or less. When the average secondary particle diameter of the abrasives is smaller, there is a tendency that the surface of the object to be polished after polishing has few scratches, the surface roughness decreases, and the surface is further smoothened. The average secondary particle diameter of the abrasives can be measured by a dynamic light scattering method, a laser diffraction method, a laser scattering method, an aperture impedance method, or the like, for example.

Although not limited, with respect to the surface roughness Ra of the object to be polished, which is polished using the abrasives, when alumina abrasives are used, the surface roughness Ra is 50 nm or less and, when silica abrasives are used, the surface roughness Ra is 20 nm or less, for example. The surface roughness Ra can be measured using a stylus type or laser-type measurement machine.

The concentration of the abrasives in the polishing composition is preferably 45% by mass or less and more preferably 25% by mass or less. When the concentration of the abrasives is lower, the dispersibility is good and the cost can be reduced. The concentration of the abrasives in the polishing composition is preferably 2% by mass or more and more preferably 10% by mass or more. When the concentration of the abrasives is higher, the polishing removal rate increases.

The type of the additives is not particularly limited, and, for example, additives, such as a pH adjuster, a complexing agent, an etching agent, an oxidizer, a water-soluble polymer, an anticorrosive, a chelating agent, a dispersion assistant, an antiseptic, and an antifungal agent, may be added as desired to the polishing composition.

The various additives are known as those which can be usually added in the polishing composition in a large number of Patent Literatures and the like and the type and the addition amount of the additives are not particularly limited. However, with respect to the addition amount when adding these additives, the addition amount of each additive is preferably less than 1% by mass and more preferably less than 0.5% by mass based on the entire polishing composition. These additives may be used alone or in combination of two or more kinds thereof.

[pH of Polishing Composition]

Although the pH of the polishing composition is not particularly limited, and the polishing composition is preferably acidic or alkaline. Specifically, when the polishing composition is acidic, the pH is preferably 5 or less and the pH is more preferably 3 or less. When the polishing composition is alkaline, the pH is preferably 8 or more and the pH is more preferably 9.5 or more.

The pH is controllable by the acid which is one component of the polishing composition or a salt thereof and is also controllable by using known other acids, bases, or salts thereof.

[PH Adjuster]

As the pH adjuster, known acids, bases, or salts thereof are usable. Examples of the acids usable as the pH adjuster include inorganic acids and organic acids. Examples of the inorganic acids include, for example, hydrochloric acid, sulfuric acid, nitric acid, fluoric acid, boric acid, carbonic acid, hypophosphorous acid, phosphorous acid, phosphoric acid, and the like. Examples of the organic acids include, for example, formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, diglycolic acid, 2-furancarboxylic acid, 2,5-furandicarboxylic acid, 3-furancarboxylic acid, 2-tetrahydrofurancarboxylic acid, methoxy acetic acid, methoxy phenylacetic acid, phenoxyacetic acid, and the like.

Examples of the bases usable as the pH adjuster include amines, such as aliphatic amine and aromatic amine, organic bases, such as quaternary ammonium hydroxide, hydroxides of alkali metals, such as potassium hydroxide, hydroxides of alkaline earth metals, ammonia, and the like.

Instead of the acids or in combination with the acids, salts, such as ammonium salts or alkali metal salts of the acids, may be used as the pH adjuster. In particular, in the case of a salt of weak acid and a strong base, a salt of strong acid and a weak base, or a salt of weak acid and a weak base, a pH buffering action can be expected and, in the case of a salt of strong acid and a strong base, the adjustment of not only pH but electrical conductivity can be achieved with a small amount thereof. The addition amount of the pH adjuster is not particularly limited and may be adjusted as appropriate so that the polishing composition may have a desired pH.

[Complexing Agent]

Examples of the complexing agent include inorganic acids, organic acids, amino acids, nitrile compounds, chelating agents, and the like. Specific examples of the inorganic acids include sulfuric acid, nitric acid, boric acid, carbonic acid, and the like. Examples of the organic acids include formic acid, acetic acid, propionic acid, butyric acid, valeric acid, 2-methylbutyric acid, n-hexanoic acid, 3,3-dimethylbutyric acid, 2-ethylbutyric acid, 4-methylpentanoic acid, n-heptanoic acid, 2-methylhexanoic acid, n-octanoic acid, 2-ethylhexanoic acid, benzoic acid, glycolic acid, salicylic acid, glyceric acid, oxalic acid, malonic acid, succinic acid, glutaric acid, adipic acid, pimelic acid, maleic acid, phthalic acid, malic acid, tartaric acid, citric acid, lactic acid, and the like. Organic sulfuric acids, such as methanesulfonic acid, ethanesulfonic acid, and isethionic acid, are also usable. Instead of the organic acids or the inorganic acids or in combination with the organic acids or the inorganic acids, salts, such as alkali metal salts of inorganic acids or organic acids, may be used. Among the complexing agents, glycine, alanine, malic acid, tartaric acid, citric acid, glycolic acid, isethionic acid, or a salt thereof is preferable.

Examples of the chelating agent include carboxylic acid-based chelating agents, such as gluconic acid, amine-based chelating agents, such as ethylenediamine, diethylenetriamine, and trimethyltetraamine, and polyaminopolycarboxylic acid-based chelating agents, such as ethylenediaminetetraacetic acid, nitrilotriacetic acid, hydroxyethylethylenediaminetriacetic acid, triethylenetetraminehexaacetic acid, and diethylenetriaminepentaacetic acid. Moreover, organic phosphonic acid-based chelating agents, such as 2-aminoethylphosphonic acid, 1-hydroxyethylidene 1,1-diphosphonic acid, aminotri(methylenephosphonic acid), ethylenediaminetetrakis(methylenephosphonic acid), diethylenetriaminepenta(methylenephosphonic acid), ethane-1,1-diphosphonic acid, ethane-1,1,2-triphosphonic acid, methanehydroxyphosphonic acid, and 1-phosphonobutane-2,3,4-tricarboxylic acid, a phenol derivative, 1,3-diketone, and the like can be mentioned as examples of the chelating agent.

[Etching Agent]

To the polishing composition, an etching agent promoting the solution of the object to be polished (for example, alloy material) may be further added as necessary.

Examples of the etching agent include inorganic acids, such as nitric acid, sulfuric acid, and phosphoric acid, organic acids, such as acetic acid, citric acid, tartaric acid, and methanesulfonic acid, inorganic alkali, such as potassium hydroxide and sodium hydroxide, organic alkali, such as ammonia, amine, and quaternary ammonium hydroxide, and the like.

[Oxidizer]

To the polishing composition, an oxidizer oxidizing the surface of the object to be polished (for example, alloy material) may be further added as necessary.

Examples of the oxidizer include hydrogen peroxide, peracetic acid, percarbonate, urea peroxide, perchlorate, persulfate, nitric acid, potassium permanganate, and the like.

[Water-Soluble Polymer]

Examples of the water-soluble polymer include, for example, polycarboxylic acids, such as polyacrylic acid, polysulfonic acids, such as polyphosphonic acid and polystyrene sulfonic acid, polysaccharides, such as xanthan gum and sodium alginate, cellulose derivatives, such as hydroxyethylcellulose and carboxymethylcellulose, polyethylene glycol, polyvinyl alcohol, polyvinyl pyrrolidone, polyoxyethylene alkylether, polyoxyethylene alkylphenylether, sorbitan monooleate, oxyalkylene-based polymers having one or two or more kinds of oxyalkylene units, and the like. Salts of the compounds mentioned above are also usable as the water-soluble polymer.

[Anticorrosive]

To the polishing composition, an anticorrosive preventing the corrosion of the surface of the object to be polished (for example, alloy material) may be further added as necessary.

Examples of the anticorrosive include amines, pyridines, a tetraphenylphosphonium salt, benzotriazoles, triazoles, tetrazoles, benzoic acid, and the like.

[Dispersion Assistant]

To the polishing composition, a dispersion assistant facilitating the redispersion of an aggregate of the abrasives may be further added as necessary.

Examples of the dispersion assistant include condensed phosphates, such as pyrophosphate and hexametaphosphate, and the like.

[Surfactant]

Examples of the surfactant include nonionic surfactants, anionic surfactants, cationic surfactants, and ampholytic surfactants. Examples of the nonionic surfactants include an ether type, an ether ester type, an ester type, and a nitrogen containing type. Examples of the anionic surfactants include a carboxylic acid salt, a sulfonic acid salt, a sulfuric acid ester salt, and a phosphoric acid ester salt. Examples of the cationic surfactants include an aliphatic amine salt, an aliphatic quaternary ammonium salt, a benzalkonium chloride salt, benzethonium chloride, a pyridinium salt, and an imidazolium salt. Examples of the ampholytic surfactants include a carboxybetaine type, an aminocarboxylic acid salt, imidazolium betaine, lecithin, and alkylamine oxide.

[Antiseptic, Antifungal Agent]

To the polishing composition, an antiseptic and an antifungal agent may be further added as necessary.

Examples of the antiseptic include sodium hypochlorite and the like.

Examples of the antifungal agent include oxazolines, such as oxazolidine-2,5-dione, and the like.

Furthermore, the polishing composition contains liquid media as a dispersion medium for dispersing or dissolving each component or a solvent. The type of the liquid media is not particularly limited and water, an organic solvent, and the like are mentioned. The liquid media may be used alone or as a mixture of two or more kinds thereof and preferably contain water. From the viewpoint of preventing the inhibition of the action of the other components, water not containing impurities as much as possible is preferable, and specifically pure water or ultrapure water obtained by removing impurity ions with an ion exchange resin, and then removing foreign substances through a filter or distilled water is preferable.

In at least one of a proceeding process or a subsequent process of the process of performing polishing using the polishing pad of this embodiment, polishing using common polishing pads composed of suede, a nonwoven fabric, polyurethane, and the like may be performed. For example, preliminary polishing may be performed in the proceeding process and finish polishing may be performed in the subsequent process.

The polishing method of this embodiment is more suitable for a polishing method of performing polishing while continuously supplying an aqueous polishing composition, in which a platen is located on the lower side and the object to be polished is located on the upper side. From the viewpoint of productivity, it is preferable that two or more of the objects to be polished can be polished by one polishing. From the viewpoint of productivity, the diameter of the platen to which the polishing pad is attached is preferably 300 mm or more and more preferably 600 mm or more.

Furthermore, a single-side polishing device, a double-side polishing device, and the like are usable for polishing the object to be polished using the polishing pad of this embodiment.

The single-side polishing device has a holder holding the object to be polished, one platen to which the polishing pad is attached, and a rotation mechanism rotating the holder and the platen. The sizes of the polishing pad and the platen are larger than that of the object to be polished. The object to be polished is held in the holder and the polishing pad of this embodiment is attached to the platen. Then, when the object to be polished is brought into contact with the polishing pad while rotating the holder and the platen by the rotation mechanism, only the surface facing the polishing pad among a plurality of surfaces of the object to be polished can be polished. The polishing of the object to be polished using the polishing pad of this embodiment can also be performed not only using the single-side polishing device but using a double-side polishing device, a hand polisher, a polishing tape, and the like. From the viewpoint of productivity, the single-side polishing device or the double-side polishing device is preferably used.

EXAMPLES

Hereinafter, the present invention is more specifically described with reference to Table 1 by giving Examples. An object to be polished having a projection portion on the surface was polished using various polishing pads.

Examples 1 and 2 are examples utilizing carpets as the polishing pad and having a piloerection portion in which polyester fibers are raised on the surface of a base. The thickness (diameter), length, mass, and number of the fibers are as shown in Table 1.

Example 3 is an example utilizing a carpet as the polishing pad and has a piloerection portion in which wool fibers are raised on the surface of a base. The thickness, length, mass, and number of the fibers are as shown in Table 1.

Example 4 is an example utilizing a carpet as the polishing pad and has a piloerection portion in which two kinds of wool fibers are raised on the surface of a base. More specifically, one wool fiber is a fiber extending in a linear shape and the other wool fiber is a looped fiber. The thickness, length, mass, and number of the fibers are as shown in Table 1.

Example 5 is an example utilizing a carpet as the polishing pad and has a piloerection portion in which acrylic fibers are raised on the surface of a base. The thickness, length, mass, and number of the fibers are as shown in Table 1.

Example 6 is an example utilizing a carpet as the polishing pad and has a piloerection portion in which nylon fibers are raised on the surface of a base. The thickness, length, mass, and number of the fibers are as shown in Table 1.

Examples 7 to 9 and Examples 11 to 13 are examples utilizing a carpet as the polishing pad and have a piloerection portion in which polyester fibers are raised on the surface of a base and in which an elastic layer containing foamed polyurethane is laminated on the principal surface, of the two principal surfaces of the base having a sheet shape, opposite to the principal surface on which the fibers are raised. The thickness, length, mass, and number of the fibers and the thickness of the elastic layer are as shown in Table 1.

Example 10 is an example utilizing a carpet as the polishing pad and has a piloerection portion in which polyester fibers are raised on the surface of a base. The thickness, length, mass, and number of the fibers are as shown in Table 1.

Example 14 is an example utilizing a carpet as the polishing pad and has a piloerection portion in which nylon fibers are raised on the surface of a base, in which an elastic layer containing foamed polyurethane is laminated on the principal surface, of the two principal surfaces of the base having a sheet shape, opposite to the principal surface on which the fibers are raised. The thickness, length, mass, and number of the fibers and the thickness of the elastic layer are as shown in Table 1.

Example 15 is an example utilizing a carpet as the polishing pad and has a piloerection portion in which wool fibers are raised on the surface of a base, in which an elastic layer containing foamed polyurethane is laminated on the principal surface, of the two principal surfaces of the base having a sheet shape, opposite to the principal surface on which the fibers are raised. The thickness, length, mass, and number of the fibers and the thickness of the elastic layer are as shown in Table 1.

Comparative Example 1 is an example using a common suede polishing pad. The length and the mass of the fibers in Comparative Example 1 shown in Table 1 mean the thickness and the mass of a foamed polyurethane layer of the suede.

Comparative Example 2 is an example utilizing a carpet as the polishing pad and has a piloerection portion in which polyester fibers are raised on the surface of a base. The length, mass, and number of the fibers are as shown in Table 1.

TABLE 1

| | Fibers | | | | | Elastic layer | Polishing | Followability |
|---|---|---|---|---|---|---|---|---|
| | Type | Thickness [μm] | Length [mm] | Mass [g/m$^2$] | Number [fibers/cm$^2$] | Thickness [mm] | removal rate [μm/min] | of polishing pad |
| Ex. 1 | Polyester | 25 | 28 | 2560 | 1216 | — | 0.19 | Δ |
| Ex. 2 | Polyester | 21 | 33 | 2490 | 5080 | — | 0.18 | ○ |
| Ex. 3 | Wool | 39 | 7 | 810 | 2432 | — | 1.00 | ◎ |
| Ex. 4 | Wool | 41 | Linear fibers: 9 Looped fibers: 5 | 1270 | 2718 | — | 0.77 | ◎ |
| Ex. 5 | Acryl | 25 | 7 | 530 | 1520 | — | 0.54 | ○ |
| Ex. 6 | Nylon | 72 | 12 | 1100 | 4125 | — | 0.26 | ○ |
| Ex. 7 | Polyester | 16 | 6 | 320 | 19000 | 6 | 0.47 | ◎ |
| Ex. 8 | Polyester | 14 | 6 | 350 | 16600 | 7 | 0.55 | ◎ |
| Ex. 9 | Polyester | 16 | 6 | 1800 | 20000 | 5 | 0.40 | ○ |
| Ex. 10 | Polyester | 14 | 6 | 350 | 16600 | — | 0.45 | Δ |
| Ex. 11 | Polyester | 11 | 4 | 1100 | 6200 | 3 | 0.38 | ○ |
| Ex. 12 | Polyester | 31 | 10 | 310 | 8600 | 3 | 0.35 | ○ |
| Ex. 13 | Polyester | 20 | 18 | 1000 | 8400 | 6 | 2.90 | ◎ |
| Ex. 14 | Nylon | 65 | 7 | 550 | 3200 | 6 | 1.95 | ◎ |
| Ex. 15 | Wool | 34 | 9 | 690 | 2800 | 6 | 0.99 | ◎ |

TABLE 1-continued

|  | Fibers | | | | Elastic layer | Polishing | Followability |
|---|---|---|---|---|---|---|---|
|  | Type | Thickness [μm] | Length [mm] | Mass [g/m²] | Number [fibers/cm²] | Thickness [mm] | removal rate [μm/min] | of polishing pad |
| Comp. Ex. 1 | Suede | — | 0.5 | 1100 | — | — | 0.45 | X |
| Comp. Ex. 2 | Polyester | 18 | 5 | 230 | 1650 | — | 0.15 | X |

Next, the used object to be polished is described. The shape of the object to be polished is a plate shape having a length of 60 mm, a width of 60 mm, and a thickness of 10 mm and the material is an aluminum alloy of Alloy No. 7000s. Two projection portions of a substantially cylindrical shape having a diameter of 10 mm and a height of 1 mm are formed on the plate surface of the object to be polished. The two projection portions each are formed in portions near two corner portions on a diagonal line among four corner portions of the plate surface.

The plate surfaces on the side in which the projection portions are formed of such objects to be polished were individually polished using the polishing pads of Examples 1 to 15 and Comparative Examples 1 and 2. In the polishing, a slurry-like polishing composition was placed between the object to be polished and the polishing pad. The polishing composition was obtained by dispersing alumina powder having an average secondary particle diameter of 1.3 μm in water, and then dissolving citric acid therein so that the concentration was 3.5 g/L.

The polishing conditions are as follows.
(Polishing Conditions)
Polishing device: Single-side polishing device
(Diameter of Platen: 380 mm)
Polishing load: 18.1 kPa (185 gf/cm²)
Rotation speed of platen: 90 min$^{-1}$
Polishing removal rate (Linear velocity): 71.5 m/m
Polishing time: For 10 minutes
Polishing composition supply rate: 40 mL/m When the polishing was completed, the polishing removal rate was calculated from a mass difference before and after the polishing of the object to be polished. The polishing removal rate is shown in Table 1.

Moreover, the surface of the object to be polished was visually observed to check whether there was a portion which was not sufficiently polished of the surface of the object to be polished. When the portion which was not sufficiently polished was present in the portions near the projection portions of the surface of the object to be polished, the distance between the portion which was sufficiently polished and the proximal end portions of the projection portions was measured. Then, the followability (deformability of the polishing pad) of the polishing pad to the shape of the projection portions was evaluated from the measurement results (distance) based on the following criteria.

More specifically, when the distance between the portion which was sufficiently polished and the proximal end portions of the projection portions was 3 mm or more, the followability of the polishing pad was evaluated to be poor and was indicated by the x mark in Table 1. When the distance was 2 mm or more and less than 3 mm, the followability of the polishing pad was evaluated to be good and indicated by the Δ mark in Table 1. When the distance was 0.5 mm or more and less than 2 mm, the followability of the polishing pad evaluated to be better and indicated by the ○ mark in Table 1. When the distance was less than 0.5 mm, the followability of the polishing pad evaluated to be particularly good and indicated by the ⊚ mark in Table 1.

As is understood from Table 1, in Examples 1 to 15, the followability of the polishing pad was good and the portions near the projection portions of the surface of the object to be polished were sufficiently polished. On the other hand, in Comparative Example 2, the mass of the fibers was small, and therefore the followability of the polishing pad was poor and the portions near the projection portions of the surface of the object to be polished were not sufficiently polished. In Comparative Example 1, the polishing pad was formed of suede, and therefore the followability of the polishing pad was poor and the portions near the projection portions of the surface of the object to be polished were not sufficiently polished.

REFERENCE SIGNS LIST

1 piloerection portion
2 object to be polished
11 base
12 fibers
21 projection portion
22 recessed portion

The invention claimed is:

1. A polishing pad used for polishing an object to be polished containing metal, an alloy, or a metal oxide material and having at least one of a projection portion and a recessed portion on a surface, the polishing pad comprising:
   a piloerection portion in which a plurality of fibers having a length of 2 mm or more are raised on a surface of a base, wherein
   a mass of the fibers is 250 g/m² or more; and
   the fibers have a length of 10 mm or more.

2. The polishing pad according to claim 1, wherein the mass of the fibers is 800 g/m² or more.

3. The polishing pad according to claim 1, wherein a number of the fibers is 1000 fibers/cm² or more.

4. The polishing pad according to claim 1, wherein the number of the fibers is 4000 fibers/cm² or more.

5. The polishing pad according to claim 1, having a multilayer structure in which an elastic layer containing an elastic body is provided on a side opposite to a side in which the fibers are raised of the base.

6. The polishing pad according to claim 1, wherein a height of the projection portion or a depth of the recessed portion is 0.1 mm or more.

7. The polishing pad according to claim 1, wherein the length of the fibers is 5.5 times or more the height of the projection portion or the depth of the recessed portion.

8. The polishing pad according to claim 1, wherein a projected area of the projection portion or the recessed portion in a vertical projection view when the projection portion or the recessed portion is viewed from a point of view at a position perpendicular to the surface of the object to be polished is 0.1 cm² or more.

9. The polishing pad according to claim 1, wherein the polishing pad is used for polishing the object to be polished using a polishing composition comprising abrasives having an average secondary particle diameter of 5 μm or less and water.

10. The polishing pad according to claim 1, wherein the polishing pad is used for a polishing device having a platen to which the polishing pad is attached and a rotation mechanism rotating the platen, in which sizes of the polishing pad and the platen are larger than a size of an object to be polished, the object to be polished is contacted with the polishing pad, and only a surface facing the polishing pad among a plurality of surfaces of the object to be polished is polished.

11. A polishing method comprising:
polishing an object to be polished using the polishing pad according to claim 1.

12. A polishing method comprising:
polishing an object to be polished containing metal, an alloy, or a metal oxide material and having at least one of a projection portion and a recessed portion on a surface using the polishing pad according to claim 1 and a polishing composition containing abrasives having an average secondary particle diameter of 5 μm or less and water.

13. The polishing method according to claim 11, comprising:
bringing the object to be polished into contact with the polishing pad, and then
polishing only a surface facing the polishing pad among a plurality of surfaces of the object to be polished using a polishing device having a platen to which the polishing pad is attached and a rotation mechanism rotating the platen and in which sizes of the polishing pad and the platen are larger than a size of the object to be polished.

14. The polishing pad according to claim 2, wherein a number of the fibers is 1000 fibers/cm² or more.

15. The polishing pad according to claim 2, wherein a number of the fibers is 4000 fibers/cm² or more.

16. The polishing pad according to claim 3, wherein a number of the fibers is 4000 fibers/cm² or more.

* * * * *